United States Patent Office 3,704,289
Patented Nov. 28, 1972

3,704,289
INTERMEDIATES FOR MAKING LINCOMYCINS AND PROCESS FOR PREPARING THE SAME
Barney J. Magerlein, Portage, Mich., assignor to The Upjohn Company, Kalamazoo, Mich.
No Drawing. Continuation-in-part of application Ser. No. 867,362, Oct. 17, 1969. This application May 6, 1970, Ser. No. 35,255
Int. Cl. C07c 47/18
U.S. Cl. 260—210 R
3 Claims

ABSTRACT OF THE DISCLOSURE

Lincomycin is formed by tosylating methyl 1-thio-α-D-galactooctopyranoside to form methyl 6-O-(p-toluenesulfonyl)-1-thio-α-D-galactopyranoside, acylating the resulting compound to form the peracylate, replacing the tosyl group with iodine to form peracylated methyl 6-deoxy-6-iodo - 1 - thio-α-D-galactopyranoside, replacing the iodo group by a nitro group to form peracylated methyl 6-deoxy-6-nitro-1-thio-α-D-galactopyranoside, treating the latter with acetaldehyde and sodium methoxide to form methyl 6 - deamino-6-nitro-α-thiolincosaminide, reducing the latter with lithium aluminum hydride to form methyl α-thiolincosaminide, and acylating the latter with trans-1-methyl-4-propyl-L-2-pyrrolidinecarboxylic acid. By substituting other aldehydes and/or other 1-thio-α-D-galactopyranosides, analogs of lincomycin are obtained.

CROSS REFERENCE TO RELATED APPLICATION

This application is a continuation-in-part of my copending application Ser. No. 867,362, filed Oct. 17, 1969, and now abandoned.

BRIEF SUMMARY OF INVENTION

This invention relates to novel compounds useful as intermediates particularly in the synthesis of lincomycin and to a process for the preparation of the same. More particularly the invention relates to lower-alkyl 6-deoxy-6-iodo-1-thio-α-D-galactopyranosides of the formula

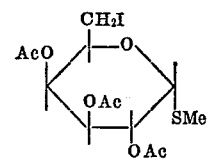

V in which Ac is hydrogen or acetyl or like lower-carboxacyl, for example, lower-alkanoyl, benzoyl and the like and Me is methyl or like lower-alkyl.

The novel compounds VAc, that is, compound of Formula V where Ac (Formula V) is carboxacyl, are useful as intermediates for making lincomycin and lincomycin analogs. The novel compounds VH, that is where Ac (Formula V) is hydrogen, can be used to modify polyurethane resins. Either as such or after condensation with ethylene or propylene oxide, they can be added to the reaction mixture of polyol and polyisocyanate and function therein as a cross-linking agent or as all or part of the polyol component.

The preparation of the novel compounds of the invention and the preparation of lincomycin and lincomycin analogs therefrom are shown in the following sequence:

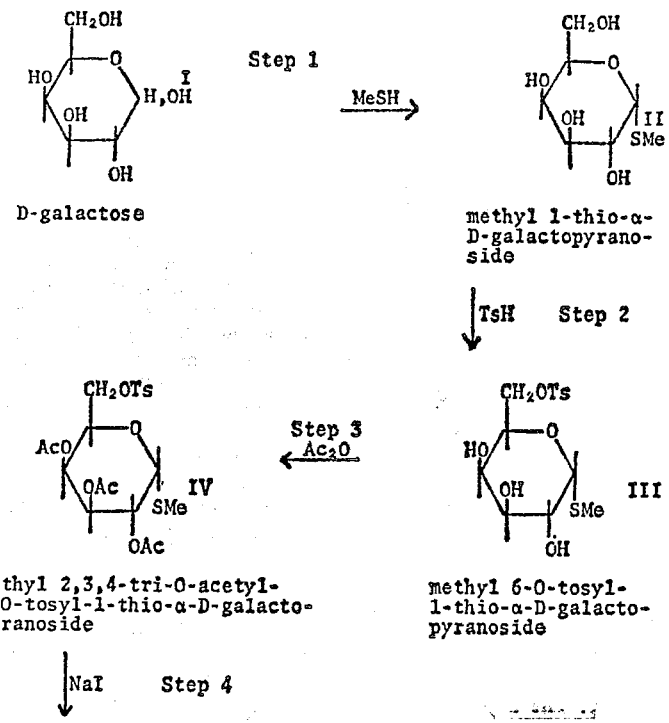

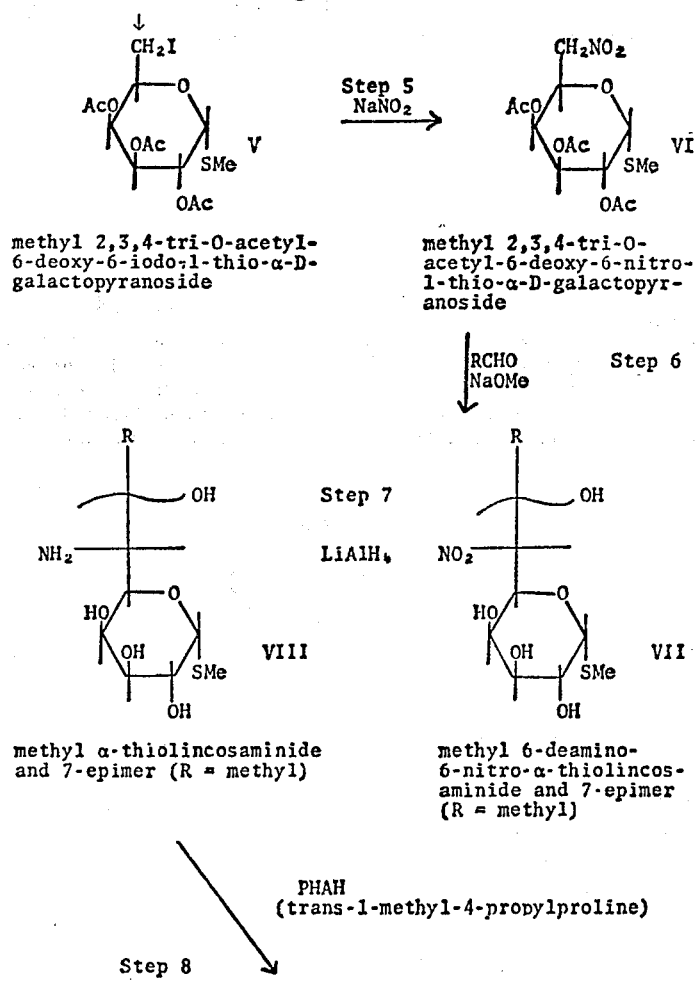

methyl 2,3,4-tri-O-acetyl-6-deoxy-6-iodo-1-thio-α-D-galactopyranoside methyl 2,3,4-tri-O-acetyl-6-deoxy-6-nitro-1-thio-α-D-galactopyranoside methyl α-thiolincosaminide and 7-epimer (R = methyl)

methyl 6-deamino-6-nitro-α-thiolincosaminide and 7-epimer (R = methyl)

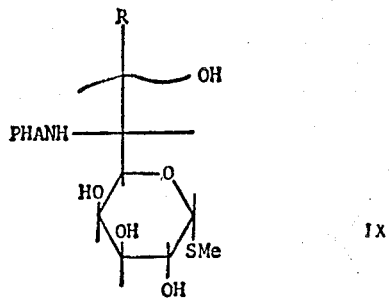

Lincomycin and 7-epimer (R = methyl)

On exposing the mixed epimers IX to chromatography or liquid-liquid countercurrent extraction, for example adsorption chromatography, partition chromatography, or Craig countercurrent distribution, or like separation process, the two isomers, for example lincomycin (IXa) and 7-epilincomycin, methyl 6,8-dideoxy-6-(trans-1-methyl-4-propyl-L-2-pyrrolidinecarboxamido) - 1 - thio-D-erythro-α-D-galacto-octopyranoside and methyl 6,8 - dideoxy-6-(trans - 1-methyl-4-propyl-L-2-pyrrolidinecarboxamido)-1-thio-L-threo-α-D-galacto-octopyranoside, are separated.

The several steps generally are carried out by procedures already known in the art. The mercaptolysis (Step 1) is a known process. The tosylation (Step 2) is atypical, however, because only the 7-O-hydrogen is replaced. This is accomplished by the use of the stoichiometric amount of tosyl chloride (not more than 5% excess) and keeping the temperature low, say between about minus 5° C. and about plus 5° C. Pyridine or like tertiary base can be used as the solvent and acid acceptor. The acylation (Step 3) of the 2-, 3-, and 4- hydroxyls of the sugar can be effected by acetic anhydride or like acid anhydride in pyridine in the usual manner or by other known acylation procedures. The replacement of the tosyl group by iodine (Step 4) is effected with sodium iodide in acetone in the usual manner, and the replacement of the iodine by nitro (Step 5) is effected by sodium nitrite in dimethylformamide to which phloroglucinol may be added to reduce side reactions. Advantageously an excess of sodium nitrite is used, and the reaction is effected with gentle heating say to between about 50° C. and about 75° C. Step 6 is an aldol-type condensation in which the α-hydrogen is activated by the nitro group instead of by a carbonyl, as in the Sowden-Fischer synthesis. Step 7 is a standard lithium aluminum hydride reduction and Step 8 is an acylation by known acylation procedures, for example, those disclosed in U.S. Pat. 3,380,992.

In place of the trans-1-methyl-4-propylproline, there can be substituted other L-2-pyrrolidinecarboxylic acids, also in accordance with the disclosure in U.S. Pat.

3,380,992, whereby analogs of lincomycin and its 7-epimer are obtained. Also in place of acetaldehyde (Step 6), there can be substituted other aldehydes for example formaldehyde, propionaldehyde, butyraldehyde, benzaldehyde, or substituted aldehydes for examples salicylaldehyde, tolualdehyde, methylphentanal, nitrobenzaldehyde, or vanillin. For example if formaldehyde is substituted, 8-norlincomycin, 6-(trans-1-methyl-4-propyl-L-2-pyrrolidinecarboxamido) - 1 - thio - L-glycero-α-D-galacto-heptopyranoside, is obtained. Similarly when propionaldehyde is substituted, there are obtained 8-homolincomycin, methyl 6,8,9-trideoxy-6-(trans-1-methyl-4-propyl-L-2-pyrrolidinecarboxamido) - 1-thio-D - erythro-α-D-galactononopyranoside, and 8 - homo-7-epilincomycin, methyl 6,8,9-trideoxy-6-(trans-1-methyl - 4-propyl-L-2-pyrrolidinecarboxamido)-1-thio - L - threo-α-D-galacto-nonopyranoside.

Ac in the above compounds represents a carboxacyl protective group as commonly used in sugar chemistry. Ordinarily, it will be acetyl or benzoyl, but can be any equivalent protective carboxacyl group. Whenever desired the Ac groups can be removed by base catalyzed hydrolysis. Me is methyl or other lower-alkyl group. R is the radical of an aldehyde, RCHO, e.g., formaldehyde (R is hydrogen), acetaldehyde (R is methyl), propionaldehyde (R is ethyl), butyraldehyde (R is propyl), benzaldehyde (R is phenyl), salicylaldehyde (R is 2-hydroxyphenyl), tolualdehyde (R is tolyl), methylpental (R is methylbutyl), nitrobenzaldehyde (R is nitrophenyl), or vanillin (R is 3-methoxy-4-hydroxyphenyl).

DETAILED DESCRIPTION OF THE INVENTION

The invention can be more fully understood by reference to the following example in which the solvent ratios are by volume and the other parts and proportions are by weight unless otherwise specified.

EXAMPLE.—Methyl 6-deoxy-6-iodo-α-thiolincosaminide (V) and its conversion to lincomycin and 7-epilincomycin Part A.—D-galactose dimethyldithioacetal

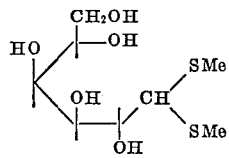

To a solution of 25 g. of D-galactose (I) in 100 ml. of conc. hydrochloric acid cooled to 0° C. was added 25 g. of methanethiol. The reaction mixture was permitted to warm to room temperature and stirred for 17 hrs. The addition of 250 ml. of ethanol caused crystallization of D-galactose dimethyldithioacetal (X) which was collected by filtration, washed and dried. A yield of 13.5 g. (35% yield) of crude D-galactose dimethyldithioacetal (X), M.P. 157–159° C. was thus obtained. Recrystallization of 1 g. of this material from methanol afforded 850 mg. of D-galactose dimethyldithioactetal (X), M.P. 160–163° C., [α]$_D$ +6° (MeOH, c.=0.35). The mother liquors were pooled and reserved for Part B.

An excess of lead carbonate was added to the alcohol filtrate, and the mixture was filtered. The filtrate was concentrated under vacuum to a small volume at which point crystals formed. After cooling, the crystals were collected, washed and dried. The crude crystals of D-galactose dimethyldithioaectal (X) weighed 7.7 g. Recrystallization of this product from methanol gave 4.6 g. of D-galactose dimethyldithioacetal (X), M.P. 161–164° C.

Part B.—Methyl 1-thio-α-D-galactopyranoside (II)

The mother liquors from the crystallization of D-galactose dimethyldithioacetal in part A-1 were concentrated. This residue of 16.3 g. was acylated in the usual manner with 50 ml. of acetic anhydride and 50 ml. of pyridine. The crude acetates, weighing 20.7 g., were chromatographed over 2.1 kg. of silica gel using cyclohexane: ethyl acetate (1:1) as the solvent system.

After a forerun of 4.4 l., successive 100-ml. fractions were collected. Fractions 52 through 67 were pooled and evaporated to dryness yielding 4.6 g. of a mixture of the acetate of methyl 1-thio-α-D-galactopyranoside (II) and D-galactose dimethyldithioacetal (X). This mixture was dissolved in 50 ml. of methanol and 14 drops of a 25% solution of sodium methoxide in methanol was added. After 50 minutes the reaction mixture was treated with Dowex–50(H+), a crosslinked polystyrene nuclear sulfonic acid cation exchanger in the acid form, until neutral and then chromatographed over 500 g. of silica gel using chloroform:methanol (2:1) as the solvent system. After a forerun of 650 ml., successive 50-ml. fractions were collected. Fractions 16 through 26 were pooled and evaporated to dryness yielding methyl 1-thio-α-D-galactopyranoside (II).

Part C.—Methyl 6-O-(p-toluenesulfonyl)-1-thio-α-D-galactopyranoside (III)

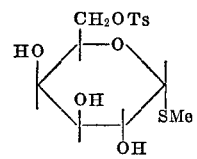

At 0° C. 5.65 g. of tosyl chloride (p-toluenesulfonyl chloride) was added to a solution of 6.0 g. of methyl 1-thio-α-D-galactopyranoside (II) in 30 ml. of pyridine. The solution was maintained at 0° C. overnight and evaporated to dryness under vacuum. The residue was stirred with dilute HCl. The crystals of crude methyl 6-O-(p-toluenesulfonyl)-1-thio-α-D-galactoside (III) were collected by filtration and dried to give 5.54 g. M.P. 132–142° C. A portion was recrystallized from methanol. The melting point of methyl 6-O-(p-toluenesulfonyl)-1-thio-α-D-galactoside (III) proved to be highly dependent on the rate of heating. When heated at the rate of 2° C./min., methyl 6 - O - (p-toluenesulfonyl)-1-thio-α-D-galactoside (III) melted at 139–140° C., sinter 136° C. Its [α]$_D^{25}$ in pyridine was +183°, c.=1.0.

Analysis.—Calcd. for $C_{14}H_{20}O_7S$ (percent): C, 46.14; H, 5.53; S, 17.60. Found (percent): C, 46.17; H, 5.86; N, 17.28.

Part D.—Methyl 6-O-(p-toluenesulfonyl)-1-thio-α-D-galactopyranoside 2,3,4-tri-O-acetate (IV)

Acylation of 4.54 g. of methyl 6-O-(p-toluenesulfonyl)-1-thio-α-D-galactoside (III) with 13 ml. of pyridine and 13 ml. of acetic anhydride at room temperature for 17 hrs. yielded 4.9 g. of glassy methyl 6-O-(p-toluenesulfonyl) - 1 - thio-α-D-galactopyranoside 2,3,4-tri-O-acetate (IV).

Analysis.—Calcd. for $C_{20}H_{26}O_{10}S_2$ (percent): Mol. wt. 490. Found (percent): M+ 490. (Molecular ion, mass spec.)

Part E.—Methyl 6-deoxy-6-iodo-1-thio-α-D-galactopyranoside 2,3,4-tri-O-acetate (V)

A solution of 19.5 g. of crystalline methyl 6-O-(p-toluenesulfonyl)-1-thio-α-D-galactopyranoside 2,3,4-tri-O-acetate (IV) and 15 g. of NaI in 200 ml. of acetone was heated in a glass bomb at 100° C. for 7.5 hrs. After cooling, the sodium tosylate, which weighed 6.3 g. (82%), was removed by filtration. The acetone was distilled under vacuum. The residue thus freed of acetone was partitioned between methylene chloride and dilute sodium bisulfite solution and chromatographed over 1.1 kilograms of silica gel using chloroform-methanol (6:1) as the solvent system. After a forerun of 2.1 liters, successive 50-ml.

fractions were collected. Fractions 2 through 12 were pooled and evaporated to dryness yielding 9.29 g. of methyl 6-deoxy-6-iodo-1-thio-α-D-galactopyranoside 2,3,4-tri-O-acetate (V) (51.2%) as a glass.

Part F.—Methyl 6-deoxy-6-nitro-1-thio-α-D-galactopyranoside 2,3,4-tri-O-acetate (VIAc)

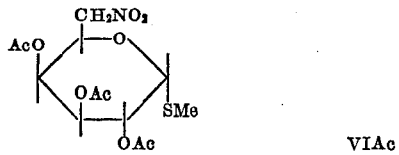

A solution of 9.29 g. of methyl 6-deoxy-6-iodo-1-thio-α-D-galactopyranoside 2,3,4-tri-O-acetate (V), 4.6 g. of NaNO₂, and 4.6 g. of phloroglucinol in 300 ml. of dimethylformamide was warmed at 65° C. (bath temp.) for 18 hrs. The solvent was evaporated in vacuo. The residue thus freed of solvent was partitioned between methylene chloride and water. The organic phase was percolated through 1.1 kg. of silica gel using cyclohexane-acetone (2:1) for elution. After a forerun of 2.3 l., 50-ml. fractions were collected. Fractions 16 through 24 were pooled and evaporated to dryness yielding 1.13 g. (14.8%) of crystalline methyl 6-deoxy-6-nitro-1-thio-α-D-galactopyranoside 2,3,4-tri-O-acetate (VIAc) which when recrystallized from ethyl acetate-technical hexane melted at 165–172° C.

Analysis.—Calcd. for $C_{13}H_{19}NO_9S$ (percent): C, 42.73; H, 5.24; N, 3.83; mol. wt., 365. Found (percent): C, 42.67; H, 5.24; N, 3.74; M⁺ 365.

Part G.—Method A

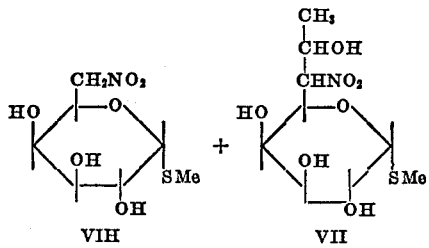

Methyl 6-deoxy-6-nitro-1-thio-α-D-galactopyranoside 2,3,4-tri-O-acetate (VIAc) (2.19 g.) was suspended in 90 ml. of methanol and under N₂ 0.7 ml. of a 25% solution of sodium methoxide in methanol was added over about 5 min. Dissolution was complete and the mixture tested basic to indicator paper. Tlc (chloroform-methanol, 6:1) showed hydrolysis to methyl 6-deoxy-6-nitro-1-thio-α-D-galactopyranoside (VIH). Acetaldehyde (1 ml.) and 0.2 ml. of a 25% solution of sodium methoxide in methanol were added, followed in 10 minutes by 1 ml. more acetaldehyde and 3 more drops of the sodium methoxide solution. The methanol solution was treated successively with 2 portions of 10 g. of Dowex–50 resin (a cross-linked polystyrene nuclear sulfonic acid cation exchanger). The methanol was evaporated and the residue chromatographed over 1.1 kg. of silica gel using chloroform-methanol (6:1) as the solvent system. After a forerun of 500 ml., successive 10-ml. fractions were collected. Fractions 25 through 39 were pooled and evaporated to dryness yielding 470 mg. (32.9%) of crystalline methyl 6-deoxy-6-nitro-1-thio-α-D-galactopyranoside (VIH), M⁺ 239. Fractions 49 through 78 were pooled and evaporated to dryness yielding 547 mg. (32.2%) of crystalline methyl 6-deamino-6-nitro-α-thiolincosaminide and its 7-epimer (VII), M⁺ 283.

Method B

In the manner described in method A, the 470 mg. of methyl 6-deoxy-6-nitro-1-thio-α-D-galactoside (VIH) of method A was condensed with acetaldehyde in methanol in the presence of sodium methoxide. After chromatography 280 mg. of crystalline methyl 6-deamino-6-nitro-α-thiolincosaminide and its 7-epimer (VII) (50.3%) was obtained.

Part H.—Methyl α-thiolincosaminide and its 7-epimer (VIII)

Methyl 6-deamino-6-nitro-1-thio-α-lincosaminide and its 7-epimer (VII) (220 mg.) from Part G was dissolved in 3 ml. of tetrahydrofuran and added to 200 mg. of lithium aluminum hydride in 5 ml. of tetrahydrofuran. The reaction mixture was stirred for 0.5 hr. at 20° C. and heated at reflux for 0.75 hr. with cooling. A few drops of water were added and the mixture filtered. Evaporation of the filtrate gave only 9 mg. of an oil. The filtration residue was washed well with water and lyophilized. It was then chromatographed over 20 g. of silica gel using methanol as the solvent system. After a forerun of 40 ml., successive 2-ml. fractions were collected. Fractions 2 through 14 were pooled and evaporated to dryness yielding 14 mg. of material containing methyl α-thiolincosaminide and its 7-epimer (VIII).

Part I.—Lincomycin (IXa) and its 7-epimer

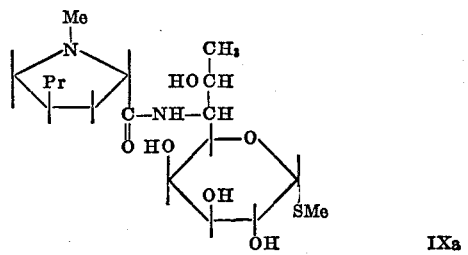

To a solution of 63 mg. (0.3 mmole) of trans-1-methyl-4-propyl-L-2-pyrrolidinecarboxylic acid hydrochloride and 84 mg. of triethyl amine in 6 ml. acetonitrile was added 42 mg. of isobutyl chloroformate with cooling in an ice-methanol bath. To this solution there was added a solution of 58 mg. of crude methyl α-thiolincosaminide and its 7-epimer (VIII), prepared according to Part B, in 3 ml. of water. After stirring for 1 hr. the reaction mixture was evaporated to dryness in vacuo and the residue taken up in methylene chloride. The methylene chloride extract after filtering over anhydrous sodium sulfate was evaporated to dryness yielding about 100 mg. of crude lincomycin. The crude lincomycin was chromatographed over 15 g. of silica gel using chloroform-methanol (4:1) as the solvent system. After a 40 ml. forerun, 1-ml. fractions were combined. Fractions 2, 3, and 4 were pooled and evaporated to dryness yielding a product containing both lincomycin and its 7-epimer. Fractions 5 through 19 were pooled and evaporated to dryness yielding 6 mg. crude lincomycin as an oil. This was converted to hydrochloride and crystallized from aqueous acetone to yield crystalline lincomycin hydrochloride.

I claim:
1. A compound of the formula

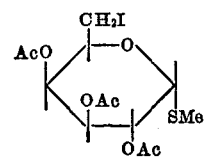

where Me is lower alkyl and Ac is hydrogen, lower-alkanoyl, or benzoyl.

2. A compound according to claim 1 in which Ac is lower-alkanoyl and Me is lower-alkyl.

3. A compound according to claim 1 in which Ac is acetyl and Me is methyl.

References Cited

UNITED STATES PATENTS 2,365,776 12/1944 Raymond et al. ___ 260—210 R
2,847,413 8/1958 Folkers et al. _____ 260—210 R

OTHER REFERENCES

Pigman, "The Carbohydrates," 1957, Academic Press Inc., New York, N.Y. pp. 164 and 165.

LEWIS GOTTS, Primary Examiner

J. R. BROWN, Assistant Examiner

U. S. Cl. X.R.

260—9 R